United States Patent
Kasperkiewicz (10) Patent No.: US 8,331,721 B2
(45) Date of Patent: Dec. 11, 2012

(54) AUTOMATIC IMAGE CORRECTION PROVIDING MULTIPLE USER-SELECTABLE OPTIONS

(75) Inventor: Tomasz S. M. Kasperkiewicz, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 903 days.

(21) Appl. No.: 11/820,850

(22) Filed: Jun. 20, 2007

(65) Prior Publication Data

US 2008/0317376 A1 Dec. 25, 2008

(51) Int. Cl.
*G06K 9/40* (2006.01)

(52) U.S. Cl. ........ 382/274; 345/590; 348/191; 348/362; 382/167; 382/254; 382/311

(58) Field of Classification Search .......... None
See application file for complete search history.

(56) References Cited

U.S. PATENT DOCUMENTS

| | | | |
|---|---|---|---|
| 5,233,413 A | 8/1993 | Fuchsberger | |
| 5,680,327 A * | 10/1997 | Cook et al. | 356/326 |
| 5,812,286 A * | 9/1998 | Lin | 358/519 |
| 6,307,961 B1 * | 10/2001 | Balonon-Rosen et al. | 382/167 |
| 6,504,953 B1 | 1/2003 | Behrends | |
| 6,859,618 B1 * | 2/2005 | Yip | 396/61 |
| 6,912,307 B2 | 6/2005 | Spitzer et al. | |
| 6,970,606 B2 | 11/2005 | Lee et al. | |
| 7,071,948 B2 | 7/2006 | Wilensky | |
| 7,593,603 B1 * | 9/2009 | Wilensky | 382/311 |
| 2002/0181801 A1 | 12/2002 | Needham et al. | |
| 2002/0196972 A1 * | 12/2002 | Bayramoglu et al. | 382/167 |
| 2003/0133609 A1 * | 7/2003 | Ubillos et al. | 382/167 |
| 2004/0197022 A1 | 10/2004 | Gonsalves | |
| 2005/0169525 A1 * | 8/2005 | Lee et al. | 382/167 |
| 2005/0201634 A1 | 9/2005 | Yuan et al. | |
| 2006/0008142 A1 * | 1/2006 | Steinberg | 382/167 |
| 2006/0126083 A1 | 6/2006 | Kurumisawa et al. | |
| 2006/0165281 A1 * | 7/2006 | Fujino | 382/167 |
| 2006/0245644 A1 | 11/2006 | Whitman | |
| 2006/0280375 A1 | 12/2006 | Dalton et al. | |
| 2007/0065006 A1 * | 3/2007 | Wilensky | 382/167 |
| 2007/0195347 A1 * | 8/2007 | Momose et al. | 358/1.9 |
| 2008/0117300 A1 * | 5/2008 | Shin et al. | 348/191 |
| 2010/0157334 A1 * | 6/2010 | Oobayashi | 358/1.9 |

OTHER PUBLICATIONS

"Color Correction Wizard 0.95", VicMan Software, http://color-correction-wizard.vicman-software.qarchive.org/.
"CorrectPhoto 2.0", PictoColor Corporation, http://correctphoto.pictocolor-corporation.qarchive.org/.
Kryszczuk, et al., "Color Correction for Face Detection Based on Human Visual Perception Metaphor", pp. 1-6.

* cited by examiner

Primary Examiner — Tsung-Yin Tsai
(74) Attorney, Agent, or Firm — Mayer & Williams P.C.

(57) ABSTRACT

An arrangement is provided for automatically correcting a digital image by first examining the image to determine the class or type of correction that is needed to produce a more accurate rendition. The classes or types of corrections may include such items as exposure, color, depth of field, sharpness, distortion, and combinations thereof. The type of correction that is needed by any particular digital image is determined from an analysis of the image itself. Instead of presenting the user with a single corrected image, the user is typically presented with different renditions of the image. Each rendition corrects for the particular type of correction that has been identified, but in different ways from one another.

19 Claims, 5 Drawing Sheets

AUTOMATIC IMAGE CORRECTION PROVIDING MULTIPLE USER-SELECTABLE OPTIONS

BACKGROUND

Images that are captured using a camera generally have several kinds of problems. For example, if the camera is not properly white-balanced, images tend to have a red or blue cast. If there is insufficient lighting in the scene, images tend to be dark and show little contrast. Also, if light reflects off objects in the scene, other objects tend to have a color cast associated with the reflected light.

As another example, modern cameras often have automatic systems for estimating the proper exposure. However, these systems are sometimes fooled due to the lighting conditions or atypical characteristics of the scene being captured. In addition, modern cameras, as well as their predecessors, often allow the photographer to manually adjust the exposure setting, thereby introducing the possibility of human error.

These and other color problems are commonly fixed using image correction tools that run on a computer workstation such as a PC (personal computer). These tools allow a user to select one or more image processing functions to apply to an image and to adjust parameters of these functions. Currently available image correction tools are powerful, but tend to have a steep learning curve.

To reduce the learning curve and the time required to manipulate the image processing functions, automatic tools for image correction are available. Such tools analyze an image and adjust parameters of an image correction operation to improve the color, exposure (i.e., brightness level and contrast), and other parameters in the image. Examples of such tools include the Photoshop™ and Photoshop Elements™ software from Adobe Systems Incorporated. Functionalities of such tools may also be incorporated into other products that include a large suite of service offerings including, for example, Microsoft Windows Live™ and iPhoto™ from Apple.

Image correcting tools can often be operated in one of two different modes. In the first mode, the tools that implement these corrective measures can be manual in that, for example, a user views the image on a computer screen and employs a user interface to interactively adjust the color and/or exposure. In the second mode, the tools provide for automatic correction of color and/or exposure in an image. In these systems, a user typically accesses the image, which can be viewed on a computer screen, and activates an automatic correction program. This activation can be implicit, in the sense that the automatic correction program is called whenever the image is accessed; it can also be explicit, in which case the user clicks on a button to call the correction program when necessary.

Several current image tools include user interfaces which display a choice of corrections that may applied to an image in which various parameters are varied and shown in image previews (i.e., what the image would look like once the correction is applied). While current tools can often provide satisfactory results in some applications, the variations in corrections provided by the tools are usually based on limited information—the variations are applied to vary color or exposure simply by applying steps that are shown in multiple previews. One preview is a little lighter, another is a little darker, another preview is a little more blue, etc. However, such variations do not use any kind of deterministic methodology to understand how a user may behave or what the user's intentions may include, when determining and providing the choices of corrections that may be applied to a given image.

As a result of the inherent nature of many image correcting tools, automatic image correction can sometimes produce incorrect results because, for instance, of a failure to recognize the effect or result that the photographer intended to achieve. For example, when the exposure of an image is automatically corrected, an incorrect result may occur if the photographer intended to present a foreground object in silhouette. In this case, automatic image correction is likely to brighten the foreground object in an attempt to correct for the lack of a fill flash. Unfortunately, this automatic exposure correction is essentially the opposite of what the photographer desired. In addition to exposure corrections, other types of automatic image corrections can suffer from similar problems.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

An arrangement for automatically correcting a digital image is provided by first examining the image to determine the classes from which corrections may be applied to produce a more accurate rendition. The classes of corrections may include such items as exposure, color, depth of field, sharpness, imperfections (such as redeye or blemishes), and combinations thereof. The classes of correction that are needed by any particular digital image are deterministically derived from an analysis of the image. Instead of presenting the user with one or more arbitrarily corrected images, the user is typically presented with different renditions of the image from within a given class that are likely. Each rendition corrects for the particular class of correction that has been identified, but in different ways from one another.

In some instances in a particular class of corrections, each rendition provides a correction in a way that is mutually exclusive from other corrections that are instantiated in the class. For example, if the class of correction is exposure, an analysis of the image, and application of deterministic rules may conclude that one way to correct the image is to show a foreground object in silhouette. Another way to correct the image is to brighten the foreground object by adjusting the exposure to simulate a fill-flash. In this example, one or both renditions may be presented to the user through a graphical user interface to facilitate selection of the desired correction from within the class.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

Like reference numerals indicate like elements in the drawings.

DETAILED DESCRIPTION

Figure 1:
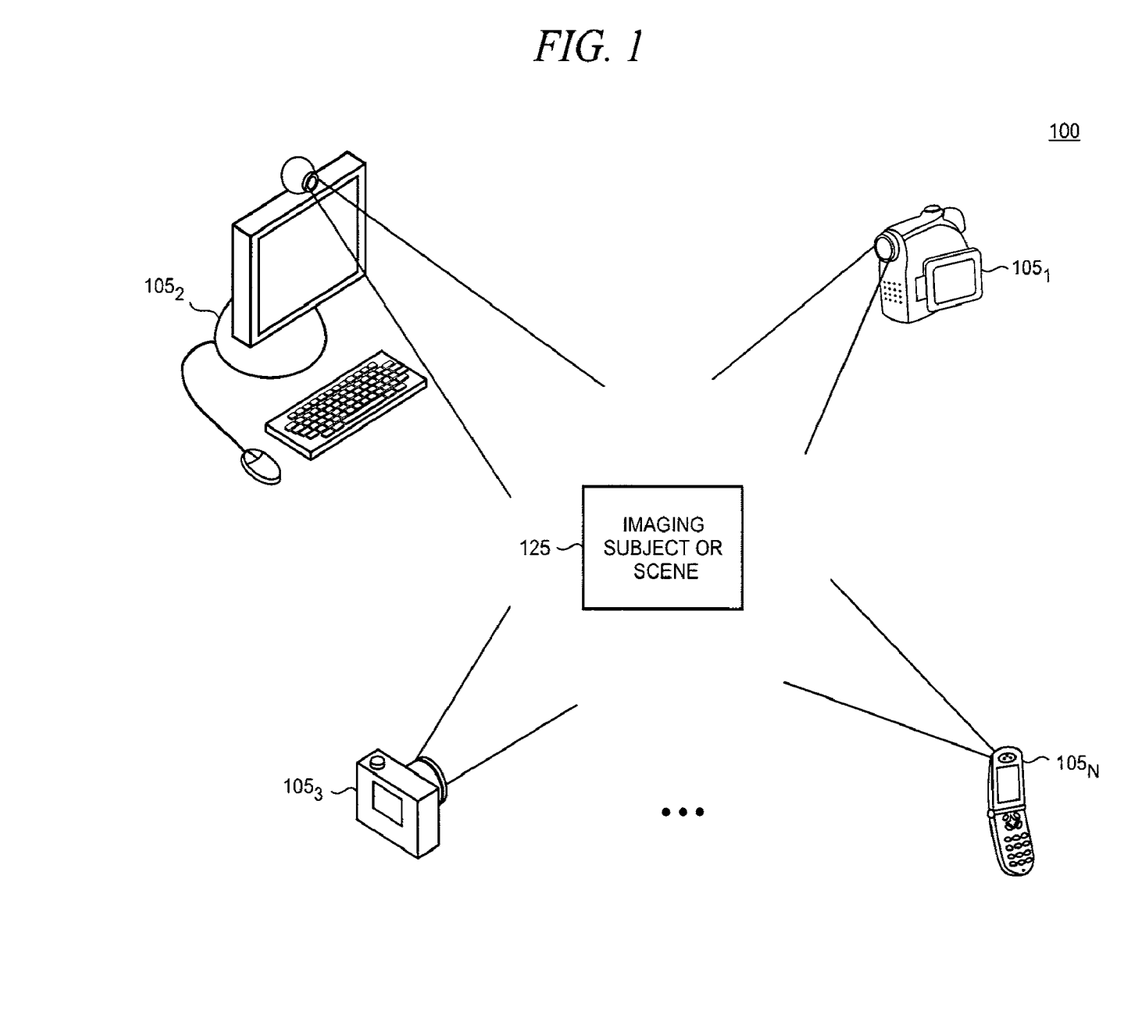
FIG. 1 shows an illustrative image capturing environment in which a variety of electronic image capturing devices may be used to capture an image of a subject.

FIG. 1 shows an illustrative image capturing environment 100 in which a variety of electronic devices 105-1, 2 . . . N may be used to capture an image of a subject or scene 125. A wide variety of electronic devices today are provided with image capturing capabilities, either as their primary functionality as in the case of digital cameras and camcorders, or as supplemental functionalities as is the case with electronic devices such as mobile phones and personal digital assistants ("PDAs"), and with web cams and the like on PCs and notebook computers. Images and videos are easily captured and transmitted over networks such as the Internet which has played a large part in the enormous popularity of digital photography. Consumers have taken advantage of falling prices and increasing quality a market phenomena in recent years.

Figure 2:
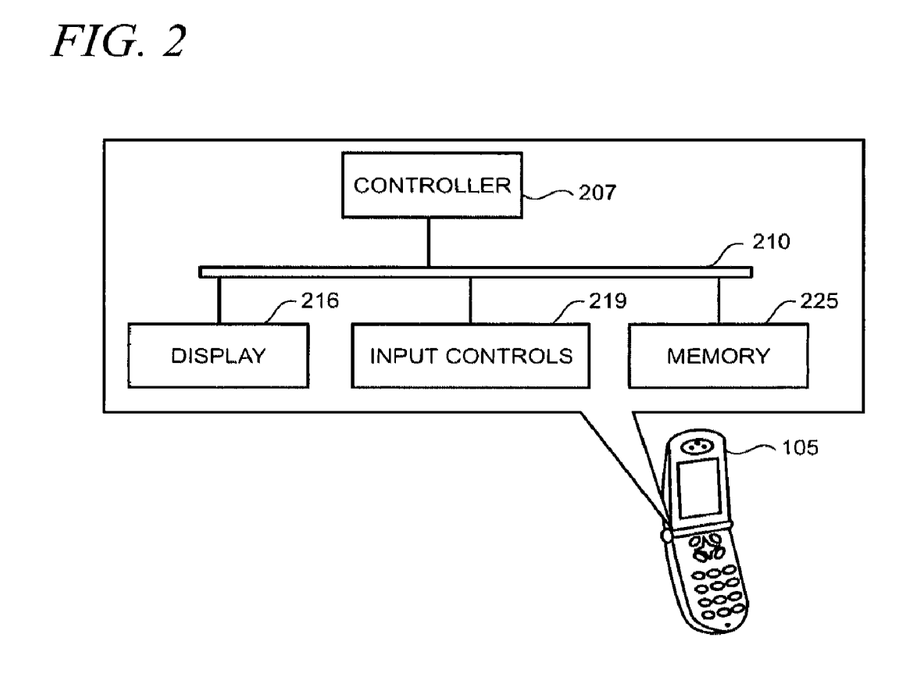
FIG. 2 is a simplified functional block diagram of a representative electronic device shown in FIG. 1.

FIG. 2 is a functional block diagram of a representative electronic device 105 in the image capturing environment 100 shown in FIG. 1. As noted above, electronic device 105 may include, for example, a desktop PC, notebook computer, PDA, pocket PC, digital camera, mobile phone, or any other electronic device that is capable of storing and displaying a digital image and performing automatic image correction on a digital image.

In FIG. 2, a controller 207 communicates over a data bus 210 with a display 216, input controls 219, and memory 225. Controller 207 may comprise, for example, a microprocessor or microcontroller. In some cases, display 216 may comprise a touch-screen. Input controls 219 may be arranged to include any input controls, physical or virtual, for controlling the operation of electronic device 105.

Figure 3:
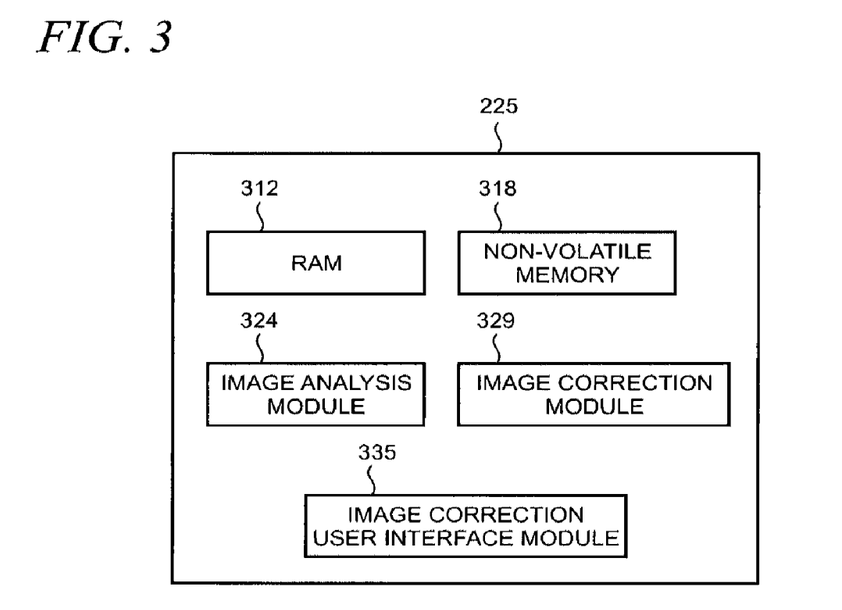
FIG. 3 is a high-level diagram of an illustrative memory architecture that may be utilized by the electronic device shown in FIG. 2.

FIG. 3 is a high-level diagram that shows the architecture of the memory 225 in electronic device 105. In general, memory 225 may comprise both random access memory (RAM) 312 and non-volatile memory 318, which may be of the removable variety (e.g., a secure digital or multi-media memory card). Memory 225 may further comprise image analysis module 324, image correction module 329, and image correction module user interface 335. Such modules are typically implemented as software code that contains methods which are invoked to perform the various functionalities and features described below. In alternative arrangements, the modules 324, 329 and 335 are implementable using hardware or combinations of hardware and software.

Image analysis module 324 is arranged, in this illustrative example, to acquire a digital image in which pixel attributes are specified by numerical values in a bitmap. Pixel attributes may include, for example, chrominance, luminance and color saturation.

The image analysis module 324 may also employ the pixel attributes to determine such image characteristics as its intensity, averaged over all the pixels, which can be used to adjust exposure, and to create a histogram of the color levels in the pixels. These image characteristics can be further used to calculate various figures of merit, which can be subsequently used to correct for problems such as over or under exposure, incorrect color balance, and the like.

The image correction module 329 perform image correction automatically, or as specified by a user. Automatic image correction can be performed using the information obtained from the image analysis module including any of the various figures of merit that may have been calculated by the image analysis module 324. In many applications of the present arrangement for automatic image correction providing multiple user-selectable options, image correction module 329 will further operate to implement one of a variety of conventional image correction techniques, as may be required by a specific implementation.

For example, in regard to automatic color correction, this generally involves correcting the color of improperly colored pixels of an image having multi-level primary color channels (e.g., red (R), green (G), and blue (B)) by first computing a histogram of the color levels of the image pixels for each of the color channels. The lowermost and uppermost color levels for each of the color channels, which are consistent with the overall distribution of color levels for the corresponding channel, are then computed using the color channel histograms.

In addition, the per channel average color level for a group of the brightest pixels may be computed. The lowermost and uppermost color levels for each of the color channels and the per channel average color levels of the brightest pixels are used to compare the color levels of pairs of the color channels to determine if the color levels in each of the pairs is balanced.

A pair of color channels can be considered balanced if the dynamic range of their color levels match within a prescribed tolerance. If the color channels are balanced, then no correction is required. However, if a compared channel pair is found to be out of balance, then the dynamic range of the color channel with the narrower range is linearly expanded to match the channel with the wider dynamic range to a desired degree.

In regard to automatic exposure correction techniques, this generally involves a system and process for correcting the exposure of improperly exposed pixels of an image by first linearly expanding the dynamic range of the intensity levels of the image pixels so as to match the full dynamic intensity range available for the application to a desired degree. It is then determined whether the linearly expanded intensity levels of the image pixels are evenly distributed. If they are, then no further correction is required.

However, if the levels are not found to be evenly distributed, then a gamma correction factor is computed and applied to the linearly expanded intensity level of each pixel to produce corrected intensity values. Of course, the aforementioned automatic exposure and color correction techniques are illustrative, and a wide variety of other techniques may be employed as well to meet the requirements of a specific application.

Image correction user interface module 335 is arranged for responding to user commands by visibly marking, selecting, editing or otherwise altering the image in accordance with the user commands. The user interface controls may comprise physical buttons or they may comprise virtual buttons displayed, for example on a touch-sensitive screen ("touch-screen") such as display 216 in FIG. 2. In the case of a touch-screen, a stylus held by the user, or a fingertip may be used to touch particular control elements on display 216, eliminating the need for most physical buttons.

Directional controls may be used, for example, to navigate among and give focus to items on display 216. These controls may also be used to toggle the status of particular options in electronic device 105 in a variety of contexts. If the electronic device 105 is a computing device such as a desktop or notebook computer, the user interface controls may include a mouse, trackball, or other pointing device, and a keyboard.

Figure 4A:
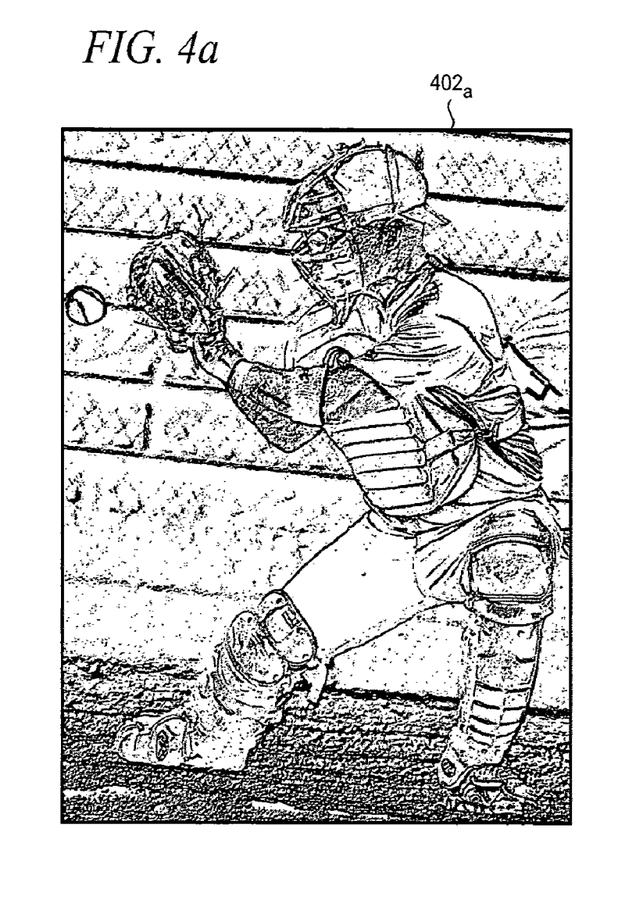
FIG. 4a is a simplified black and white representation of an illustrative color image in which exposure has been corrected to simulate a fill flash.
Figure 4B:
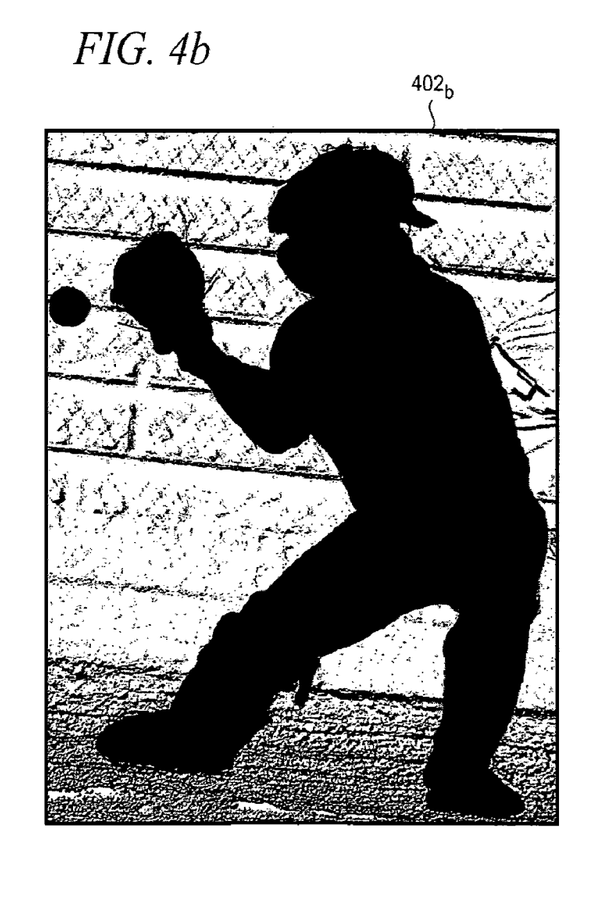
FIG. 4b is a simplified black and white representation of an illustrative color image in which exposure has been corrected to simulate a silhouette effect.

As previously mentioned, automatic image correction techniques can sometimes produce results that are virtually the opposite of what was intended. FIGS. 4a and 4b illustrate this problem for the example that was previously discussed in which a foreground object intended to be in silhouette was automatically brightened in an attempt to correct for the lack of a fill flash.

FIG. 4a is a simplified black and white representation 402a of a digital image depicting a sports scene in which the exposure has been corrected in an attempt to compensate for the lack of a fill flash, thereby allowing features of the individual in the scene to be discerned.

FIG. 4b, by comparison, shows a black and white representation 402b of the same digital image in which the exposure has been corrected in a manner that is consistent with the silhouette effect that the photographer actually intended to achieve. The images in both FIGS. 4a and 4b have undergone modification for the same type of correction (i.e. exposure), but the results that are achieved are quite distinct from one another, and, in fact, are mutually exclusive of one another.

In order to avoid producing an incorrect or unintended result when modifying a digital image using an autocorrection technique, image correction module 329 first identifies a class of correction that a digital image should preferably undergo. In the preceding example, for instance, image correction module 329 would determine that the exposure needs to be corrected. However, instead of simply modifying the image to correct for a perceived under or overexposure, image correction module 329 is arranged to determine that the class of correction identified as being applicable may be corrected in multiple ways.

In this particular illustrative example, the image correction module 329 determines that there are two likely alternative modifications that may be made when the correction type is image exposure. One modification would correct the exposure by simulating a fill-flash to brighten the foreground individual and the other modification would correct the exposure by simulating backlighting to place the individual in silhouette.

Image correction module 329 is generally arranged to apply one or more rules in order to make some prediction as to the subset of possible corrected renditions that are most likely to represent an accurate rendition of the original captured image and/or those that are most likely to represent the intent of the photographer when capturing the image. A wide variety of factors may be considered in determining the renditions to be presented, including, for example, historical statistical information concerning user behavior. The rules may also employ heuristics (i.e., rules of thumb) or be based on other expert systems or fuzzy logic arrangements.

For instance, in this illustrative example, if historical data were to show that photographers often forget to turn on the fill-flash when capturing an image, this information could be used to increase the likelihood that the rendition of the image in FIG. 4a will be presented as one option from among which the user can select. Factors such as these can be assigned different weights that can be used by the image correction module 329 in determining which renditions are to be presented to the user. In an illustrative implementation, the image correction module 329 may be arranged to find the local maxima of an assigned weight function and select any maxima that are above a certain threshold. So in the case where the image correction module 329 identifies two corrective options in the exposure class, one being a fill-flash and the other being a silhouette, the weight function might have local maxima corresponding to the fill flash correction, and another corresponding to the silhouette correction. Alternatively, if in a particular case only one of the corrective options gives rise to local maxima that exceed the threshold, then only that option exceeding the threshold would be presented to the user. So, while the image correction module 329 assesses both the flash fill and silhouette corrections, the flash fill correction is discarded for being below the threshold, for example, and only the silhouette is presented as a correction option to the user. In some implementations, the weight function may also be updated or selected in part based on additional input information received from the user.

After the likely alternative modifications are determined, the image correction module 329 then modifies the image in accordance with both alternatives and typically presents them both to the user by rendering each on the display (e.g., display 216 in FIG. 2). The user can then select which image best achieves his or her desired result using the image correction user interface module 335.

In the preceding example the exposure of the image was adjusted to provide additional backlighting and, alternatively, to provide additional front-lighting to serve as a fill-flash. Of course, when the type of correction that has been identified as being necessary is the exposure, adjustment may be performed to compensate for a wide variety of improper lighting conditions and not simply backlighting and front-lighting.

For example, in some cases there may be an ambiguity as to the location of the primary light source that is illuminating the image. For instance, an indoor scene that is being lit by sunlight through multiple windows may be adjusted so that different windows serve as the primary light source. In some cases the alternatives may be mutually exclusive of one another, as in the case of a fill-flash and a silhouette. The user can then select from among each of the resulting images.

Figure 5A:
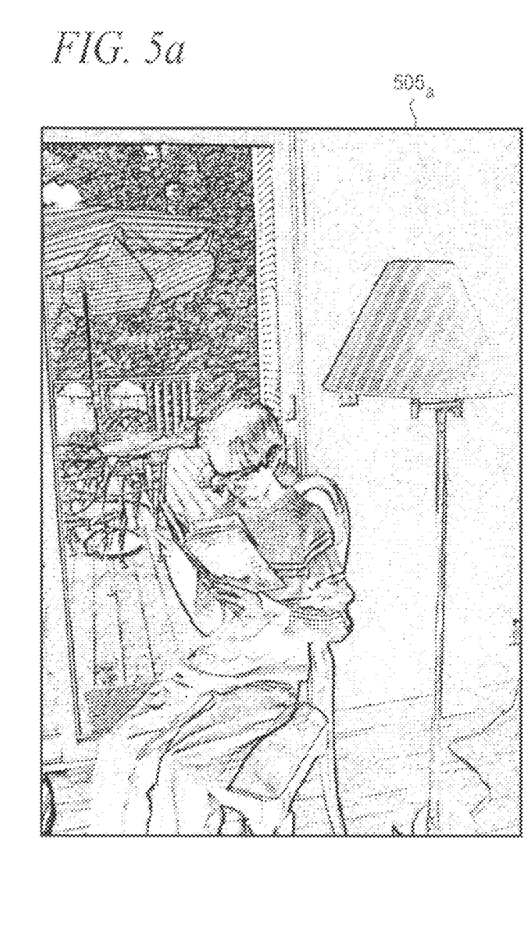
FIG. 5a is a simplified black and white representation of a color image in which color has been corrected to reflect a single light source.

In addition to exposure, corrections that are members of other classes may be performed including for example, without limitation, such items as depth of field, sharpness, imperfections (such as redeye or blemishes), as well as combinations thereof. For example, FIG. 5a is a simplified black and white representation 505a of a color digital image in which the image correction module 329 has determined that corrections belonging to the class of color correction are likely applicable.

This image shows an individual located in a room indoors. The individual is seated near a large window, which as the result of a cloudy day, casts diffuse sunlight on the individual. The image correction module 329 may determine from the image's overall color cast that the color needs to be corrected for indoor (i.e., tungsten) lighting. If the correction module 329 were to adjust the color in this manner the individual would appear to have a blue cast since in fact the individual was largely being illuminated by sunlight and not the indoor lighting.

Figure 5B:
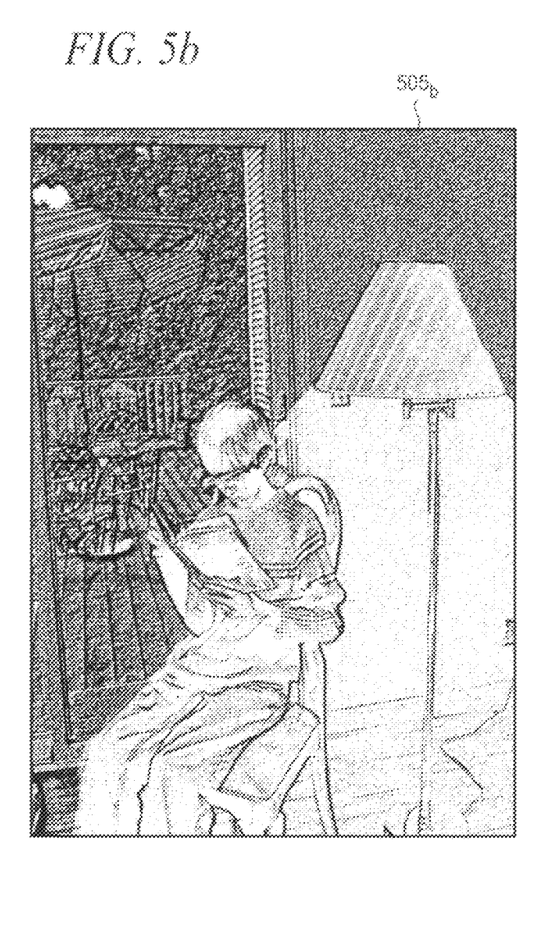
FIG. 5b is a simplified black and white representation of a color image in which color has been corrected to reflect multiple light sources.

On the other hand, the image correction module 329 could determine that there are two different color casts in different parts of the image. Instead of correcting for a single color cast, the image correction module 329 could correct each of the color casts using different lighting sources (i.e., the window and the indoor light) as indicated in the simplified black and white representation 505b of the digital color image shown in FIG. 5b.

Figure 6:
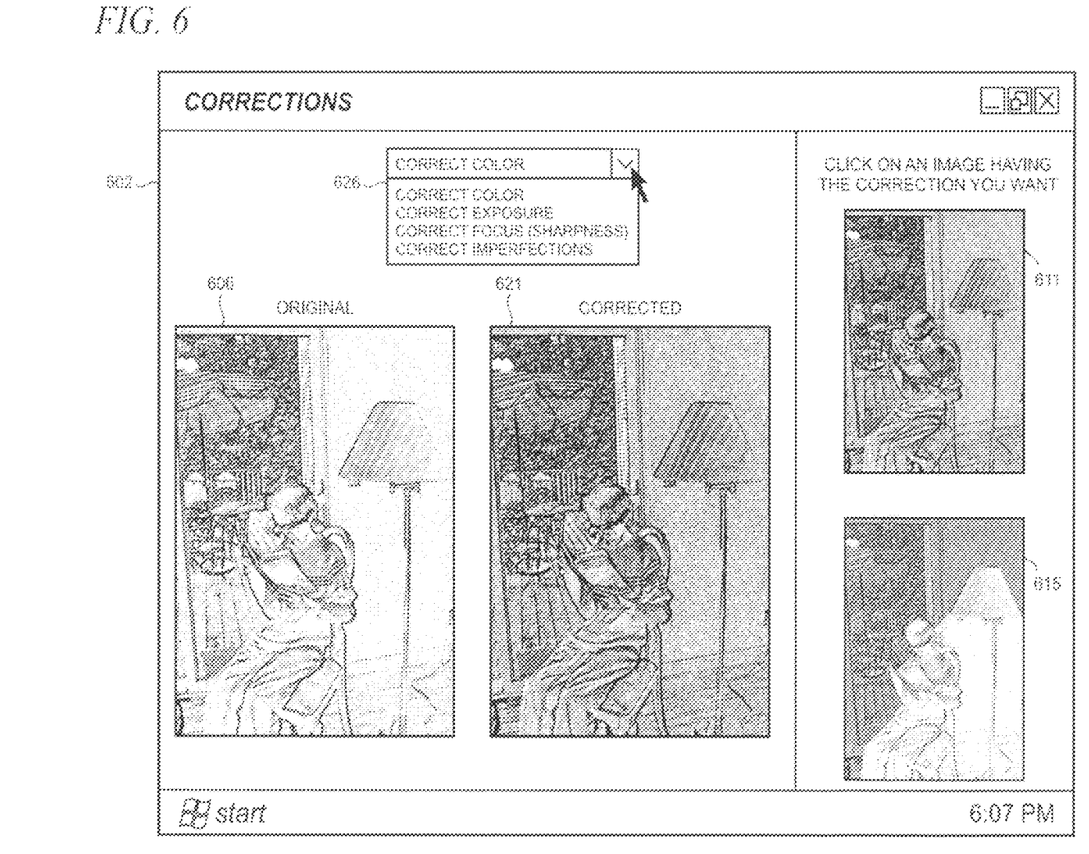
FIG. 6 shows a screenshot of an illustrative graphical user interface.

The images resulting from each different correction can be presented to the user, who can then select the most appropriate image via a user interface provided by the image correction user interface module 335. FIG. 6 shows a screenshot 602 of an illustrative graphical user interface ("GUI"), provided by the image correction user interface module 335, which simultaneously displays an original digital image 606 and several renditions 611 and 615 that have been corrected in accordance with the present arrangement.

The GUI shown in FIG. 6 is arranged in this illustrative example to be supported by a desktop image correction application that runs on a PC. Accordingly, the image correction application is typically arranged to include the functional image analysis, image correction, and image correction user interface modules shown in FIG. 3 and described in the accompanying text and utilize the present image correction methodologies described herein.

The functionality provided by such an image correction application may alternatively be arranged using a plug-in, extension, API (application programming interface) or other form to enable interactivity and/or integration with other applications. In all cases—standalone application, shared functionality, or integrated functionality—the image correction features running on the PC may be applied to images that are captured by a camera (such as a web cam) that is attached to, or integrated into the PC. The image correction features may also be applied to other images captured by other electronic devices 105 operating in the environment 100 (FIG. 1) that are transferred to the PC, for example via removable media, over a network, by e-mail, etc.

As discussed above, the image correction module 329 generates two or more corrected renditions 611 and 615 that are members of a particular class of corrections from which the user may choose, where each of the corrected renditions represents a different rendition of an original image incorporating a different modification or adjustment. The various corrected renditions that are presented will, in general, be a subset of all possible renditions that may potentially be produced by the image correction module 329.

Rendition 611 shows the image with a correction from the class of color corrections in which color in the image is adjusted to provide a blue cast that results from the indoor lighting. It is noted that the blue cast is represented by slight darkening of the black and white simplified image representation shown in 611 as compared with the original 606. However, this representation is made solely for the sake of clarity in exposition given the inherent limitations of expressing color using only black and white representations.

Rendition 615 shows the image from the class of color corrections in which color in the image is adjusted to include two different color casts—one for an area in the image that is illuminated with sunlight from the window light source, and another color cast that is applied to the area in the image that is illuminated with light from the indoor light source. Again, for clarity of exposition using a black and white representation to depict color, the two different color casts in rendition 615 are represented by respective lighter and darker areas.

The GUI represented by screenshot 602 is arranged to enable a user to select one of the available corrections in the class of color corrections by clicking on the corrected renditions 611 and 615 which are shown in reduced size (called "thumbnails") by the GUI. The selected corrected rendition is then displayed next to the original image 606 to enable a side-by-side comparison by the user as indicated by reference numeral 621 in FIG. 6.

The GUI further includes controls provided by the image correction user interface module 335 such as drop down menu 626. Drop down menu 626 is arranged to enable a user to select from one of several available classes of corrections, as shown. When a particular class of corrections is selected, various different renditions of the original image 606 are generated by the image correction module 329 and displayed by image correction user interface module 335 to reflect the available corrections from the selected class.

The description of the present arrangement for automatic image correction providing multiple user-selectable options above included several illustrative examples in which images and associated renditions of still images were utilized. However, it is emphasized that the present arrangement may also be applied to other media types, particularly including moving images (i.e., video).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for correcting a digital image, the method comprising the steps of:
    identifying a class of correction to be performed on a digital image based at least in part on data acquired from the image based upon pixel attributes specified by numerical values in a bitmap;
    assessing in connection with the digital image at least two distinct corrective options for the class of correction that has been identified, wherein each of said at least two distinct corrective options indicates a distinct modification that may be applied to the digital image, in which various parameters are varied, within the class of correction; and
    presenting a user with at least one digital image modified in accordance with at least one of the correction options,
    wherein the step of assessing in connection with the digital image at least two distinct corrective options, further includes: assigning a weight function having a local maxima corresponding to each corrective option, and
    wherein when one of said at least two distinct corrective options has a local maxima that does not exceed a threshold, the one of said at least two distinct corrective option is not presented to the user.

2. The method of claim 1 in which the class of correction is exposure to compensate for improper lighting.

3. The method of claim 2 in which the distinct corrective options include frontlighting to serve as a fill-flash for an object in the digital image and backlighting to place the object in silhouette.

4. The method of claim 2 in which the distinct corrective options include projecting light from a first direction and projecting light from a second direction that is different from the first direction.

5. The method of claim 1 in which the data acquired from the image is selected from one of (i) a level of luminosity detected in different parts of the digital image, said different parts of the digital image having a first area with a different illumination source than a second area, separate from the first area, of the image or, (ii) a different color cast in different parts of the digital image, said different parts of the digital, image having a first area with a different illumination source than a second area, separate from the first area, of the image.

6. The method of claim 1 including a further step of selecting each of the distinct corrective options in accordance with a predetermined set of factors most likely to give rise to an accurate rendition of the digital image as originally captured.

7. The method of claim 1 in which the distinct corrective options are options that are statistically most likely to reflect photographer intent when capturing the digital image.

8. The method of claim 1 in which the distinct corrective options are options that reflect the application of historical statistical information, heuristics rules, or fuzzy logic.

9. A computer-readable storage memory containing instructions which, when performed by one or more processors disposed in an electronic device, implement a user interface performing a method comprising the steps of:
   simultaneously displaying at least two choices of user-selectable images to a user, each choice representing a correction to an original digital image, the correction to be performed on the digital image based at least in part on data acquired from the image based on pixel attributes specified by numerical values in a bitmap, the correction being based on a single class of correction, wherein each choice indicates a distinct modification that may be applied to the digital image, in which various parameters are varied, within the single class of correction and the correction being deterministically derived based on a prediction of the user's intended outcome for the original image;
   receiving an input from the user responsively to the displaying to indicate a selected correction; and
   invoking a method for applying the selected correction to the original image,
   wherein the step of assessing in connection with the digital image at least two distinct corrective options, further includes: assigning a weight function having a local maxima corresponding to each corrective option, and
   wherein when one of said at least two distinct corrective options has a local maxima that does not exceed a threshold, the one of said at least two distinct corrective option is not presented to the user.

10. The computer-readable storage medium of claim 9 further including a step of updating the deterministically derived correction based on addition input information received from the user.

11. The computer-readable storage medium of claim 10 in which the prediction is a statistical prediction.

12. The computer-readable storage medium of claim 10 in which the prediction is a heuristic prediction.

13. The computer-readable storage medium of claim 10 in which each choice is a member of a class of corrections.

14. The computer-readable storage medium of claim 13 in which the class is selected from one of correction based on use of flash fill, or correction based on a lighting source within a scene captured in the original image.

15. The computer-readable storage medium of claim 10 in which the user interface is arranged to run on a device selected from a group consisting of desktop PC, notebook computer, small form factor electronic device, mobile phone, handheld game device, portable media player, or camcorder.

16. An electronic device, comprising:
   a memory in which to store a digital image;
   a display on which to show the digital image;
   an image analysis module to acquire attributes of pixels in the digital image; and
   an image correction module to identify a class of correction to be performed on the digital image based at least in part on data acquired by the image analysis module based on pixel attributes specified by numerical values in a bitmap, and to provide a modified digital image in accordance with at least two distinct corrective options for the class of correction that has been identified, wherein each of said at least two distinct corrective options indicates a distinct modification that may be applied to the digital image, in which various parameters are varied, within the class of correction;
   wherein the step of assessing in connection with the digital image at least two distinct corrective options, further includes: assigning a weight function having a local maxima corresponding to each corrective option, and
   wherein when one of said at least two distinct corrective options has a local maxima that does not exceed a threshold, the one of said at least two distinct corrective option is not presented to the user.

17. The electronic device of claim 16 further including a user interface module for selecting among the modified digital images that are presented.

18. The electronic device of claim 16 in which the electronic device is selected from one of PC, notebook computer, pocket PC, PDA, digital camera, digital camcorder, or mobile phone.

19. The electronic device of claim 17 wherein the user interface module is adapted for a touch-screen incorporated in the display.

* * * * *